(No Model.)
W. H. BURK.
FEED WATER HEATER.
No. 321,338. Patented June 30, 1885.
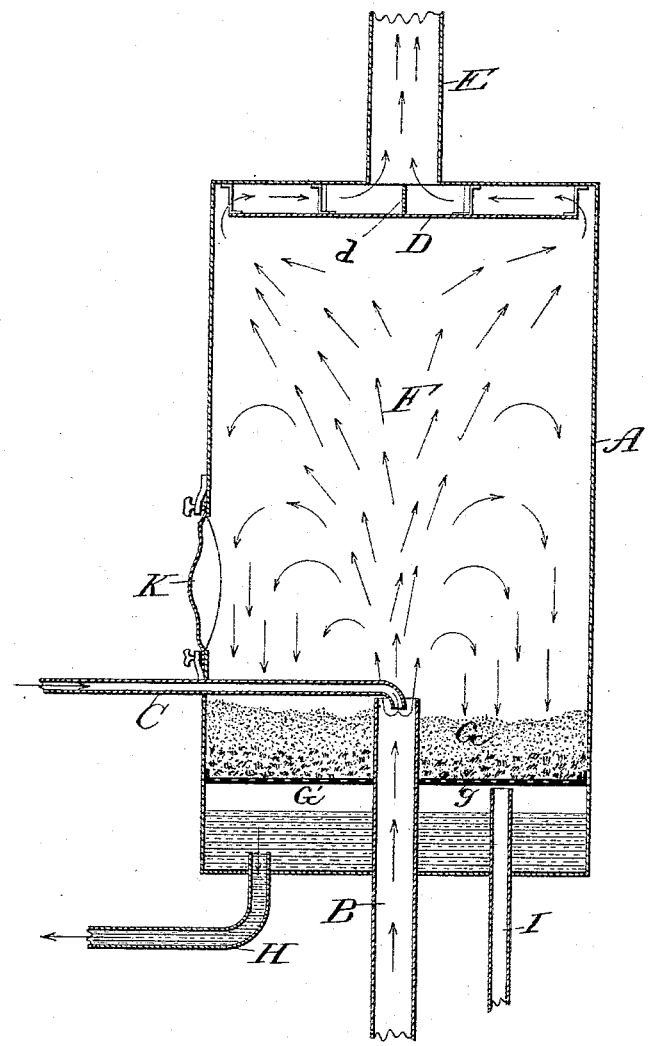
Witnesses:
E. G. Asmus
R. Platz
Inventor:
Wm H. Burk.
By Stout & Underwood
Attorneys.

United States Patent Office.

WILLIAM HENRY BURK, OF SHEBOYGAN, WISCONSIN.

FEED-WATER HEATER.

SPECIFICATION forming part of Letters Patent No. 321,338, dated June 30, 1885.

Application filed March 17, 1885. (No model.)

*To all whom it may concern:*

Be it known that I, WILLIAM H. BURK, of Sheboygan, in the county of Sheboygan, and in the State of Wisconsin, have invented certain new and useful Improvements in Feed-Water Heaters; and I do hereby declare that the following is a full, clear, and exact description thereof.

My invention relates to feed-water heaters; and it consists in certain peculiarities of construction, as will be fully set forth hereinafter.

The drawing is a vertical central section of a heater embodying my invention.

A is the shell, having the discharge exhaust-pipe B entering the heater-shell at the bottom and projecting into it for about one-third of its height. The feed-water-injection pipe C has an elbow which enters the mouth of the exhaust-pipe and is turned directly against the current of the exhaust-steam. The hanging detachable diaphragm D is placed in the top of the heater-shell, just far enough away from the head to give easy clearance for the escape of the exhaust-steam from the shell through the exhaust escape-pipe E and prevent the escape of the sprayed water, and the said diaphragm D is centrally divided by a partition, d, so that the exhaust-steam from the open steam-chamber F below escapes from each side of said diaphragm-partition out through the exhaust escape-pipe E above, as aforesaid.

F is the open steam-chamber, consisting of the balance—the other two-thirds—of the heater-shell.

G is a filter-bed, consisting of excelsior or any other suitable filtering material placed on a perforated diaphragm, g, attached to the standing inlet exhaust-pipe at about one-half of its height, so as to leave a water-chamber, G', beneath it, on the bottom of which such impurities as escape the filter may subside.

H is the feed-water-delivery pipe, which projects a proper height upward from the bottom of the heater into the water-chamber, so as to prevent any settlings from passing into the hot-water-feed pump.

I is an overflow-pipe to prevent the flooding of the heater and the consequent disarrangement of the filter-bed.

K is an ordinary man-hole for cleaning.

The working of the heater is as follows: The feed-water is forced into the exhaust-pipe at a point below its mouth, so as to secure its being thrown by the inrushing exhaust-steam with great force into the open steam-space. This produces the following results: The water is reduced to so fine a spray that in passing up and falling through the steam-space filled with hot steam it becomes as hot as the steam itself. This is an instantaneous process, and by this spraying and instantaneous heating the practical working results of the heater are obtained. Under such conditions the lime that forms the scale, and which before heating was held by the water in solution, is now separated through the agency of the heat and now exists as free lime, and only requires the mechanical operation of filtering to cause its removal. The separated lime and heated water fall together on the top of the filter-bed, the water filtering through and the lime being arrested by the filter and remaining behind. Below the filter-bed is a water-chamber for the filtered water to come to rest, where such fine impurities as escape the filter can settle on the bottom of the heater, the stand-pipe projecting into the water-chamber allowing only the water above the bottom to enter the pump-delivery.

Having thus fully described my invention, I claim as new and desire to secure by Letters Patent—

1. The feed-water-injection pipe C, introduced into the mouth of the standing exhaust-pipe B and with its nozzle projecting downward within said mouth.

2. The filter-bed G, placed below the exhaust-inlet, supported on the perforated diaphragm attached to standing exhaust-pipe, in combination with the feed-water-injection pipe C, having nozzle projecting downward into the mouth of the standing exhaust-pipe, and the open steam-chamber F, above the pipe C.

3. The hanging detachable diaphragm D, placed in the upper part of the heater and having the central partition, d, as and for the purpose set forth.

4. The heater-shell A, in combination with the exhaust discharge-inlet B, the feed-water-injection pipe C, having nozzle projecting downward within the mouth of the pipe B, the hanging diaphragm D, open steam-space F, filter-bed G, water-chamber G', feed-water-delivery pipe H, and overflow-pipe I, as and for the purpose set forth.

In testimony that I claim the foregoing I have hereunto set my hand, at Sheboygan, in the county of Sheboygan and State of Wisconsin, in the presence of two witnesses.

WILLIAM HENRY BURK.

Witnesses:
PAUL T. VEREZ,
A. F. WINTER.